United States Patent [19]

Vetter

[11] Patent Number: 4,890,483
[45] Date of Patent: Jan. 2, 1990

[54] APPARATUS FOR TESTING THE WATERTIGHT CAPACITY OF PIPES

[76] Inventor: Manfred Vetter, Burg Langendorf, D-5352 Zuelpich, Fed. Rep. of Germany

[21] Appl. No.: 134,923

[22] Filed: Dec. 18, 1987

[30] Foreign Application Priority Data

Dec. 19, 1986 [DE] Fed. Rep. of Germany ....... 3643489

[51] Int. Cl.⁴ ............................................. G01M 3/28
[52] U.S. Cl. ................................. 73/40.5 R; 73/49.1; 73/49.8; 138/90; 138/93
[58] Field of Search ...................... 73/40.5 R, 46, 49.1, 73/49.5, 49.8; 138/89, 90, 93, 104

[56] References Cited

U.S. PATENT DOCUMENTS

| 491,184 | 2/1893 | McCartney | 138/89 |
|---|---|---|---|
| 1,221,733 | 4/1917 | Henderson | 73/49.8 |
| 1,263,933 | 4/1918 | Robinson | 166/192 |
| 1,616,392 | 2/1927 | Provost | 138/90 |
| 2,177,916 | 10/1939 | Thomas et al. | 138/90 |
| 2,299,116 | 10/1942 | Svirsky | 73/46 |
| 3,032,069 | 5/1962 | Ficklin | 138/89 |
| 3,763,896 | 10/1973 | Horne et al. | 138/89 |
| 4,070,904 | 1/1978 | Vanderlans | 73/40.5 R |
| 4,083,384 | 4/1978 | Horne et al. | 138/93 |
| 4,763,511 | 8/1988 | Mathison et al. | 73/49.1 |

FOREIGN PATENT DOCUMENTS 896442 1/1982 U.S.S.R. ............................ 73/40.5 R

Primary Examiner—Hezron E. Williams
Attorney, Agent, or Firm—K. S. Cornaby

[57] ABSTRACT

An apparatus for testing for the presence of leaks in sections of pipe is intended primarily for the testing of household connections. The apparatus has a front pipe sealing pad (20) to the rear wall of which (24) is attached (a) a hose so that the sealing pad can be inflated and (b) a connection (42) for a distancing rod (44). The device also incorporates a rear pipe sealing pad (22) through which are passed, properly sealed, the hose (26), tubing for expelling air (52) and a connection for filling (51). The rear pipe sealing pad can also be joined to the distancing rod (44) and is, furthermore, connected with its internal area (46) to a connection (48) so that filling and emptying can be carried out.

7 Claims, 1 Drawing Sheet

U.S. Patent     Jan. 2, 1990     4,890,483
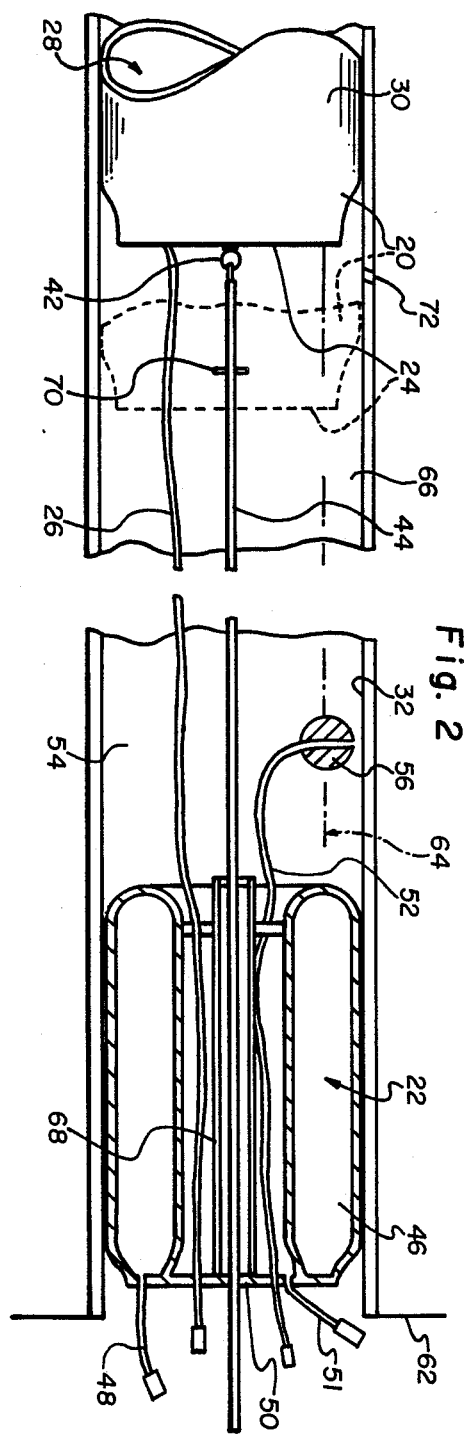
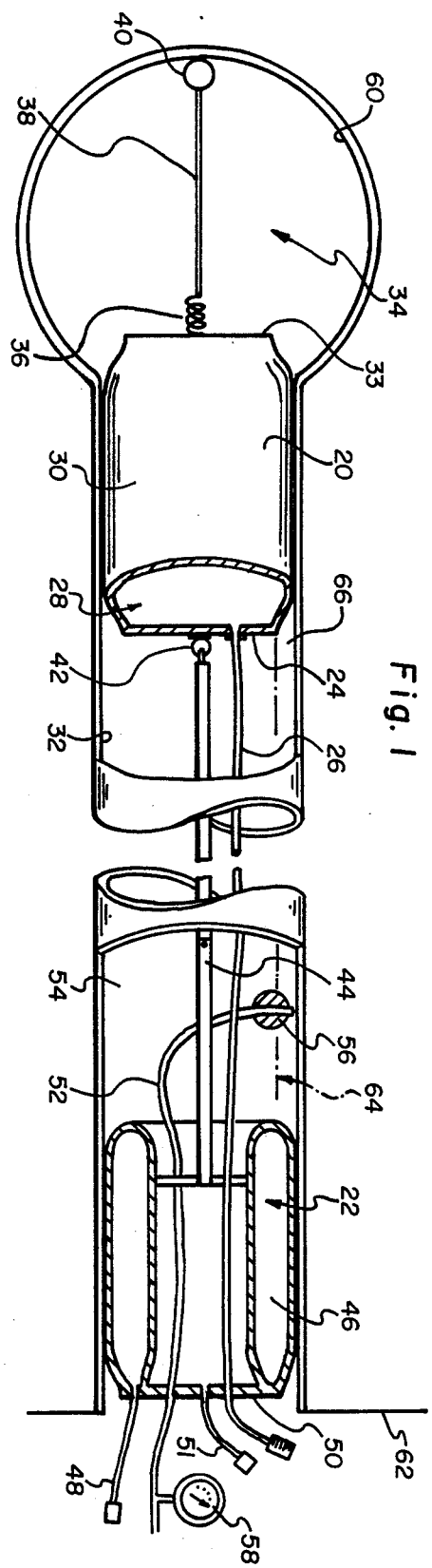
Fig. 1
Fig. 2

APPARATUS FOR TESTING THE WATERTIGHT CAPACITY OF PIPES

BACKGROUND OF THE INVENTION

The invention pertains to an apparatus for testing the watertight capacity of pipe sections, for example, waste water discharge pipes, especially pipes connecting houses to mains. The apparatus employs pipe sealing pads and utilizes a process for determining the location of a leak in a pipe section. As prescribed by German Industry Norm DIN 4033, each connection and each pipe in a public waste water discharge system has to be subjected to a test to determine that it does not leak. It is accordingly subjected to water pressure of 0.5 bar (1½ times atmospheric) pressure. In order to test sections of pipes to which unrestricted access can be gained at both ends, pipe sealing pads, for example, those identified in DE-OS 27 48 614 or in German Design Patent No. 84 13 877 are employed.

The pipe sealing pads have a cylindrical sleeve and two circular walls at each end, or have the shape of a cushion composed of two concentric cylinders or sleeves between which a medium, generally air, can be introduced and which requires only a radial, circular-shaped wall. Cushions of this latter type frequently are mug-shaped, the sealing wall being sited at one end of the circular shaped, expandable unit. When pipes, for example, waste-water discharge pipes, are being tested as to leakage, it is normal to seal each end of the connection with a pipe sealing pad, the end being sealed off by inflation. At least one of the sealing pads has a tube by means of which this space between the two sealing pads can be filled or emptied. Observation of the static pressure in the space between the two pads will reveal whether a leak exists or not, since a drop in pressure signals the presence of a leak.

This testing process, however, cannot be employed if the section of pipe is accessible from only one end. This is especially the case with household connections. Normally there is also a main connector located under the street having connections of various diameters and shapes. The connection from each household, usually a circular pipe of 150 mm diameter, (which diameter with curving and extension is increased to 250 mm at the main collecting point) is attached to the main collector. An inspection shaft (square or circular in shape and, if circular, with a diameter of 80 cm.) is normally located, dependent on the level of the street, 10 to 16 feet (3 to 5 meters) deep. Free access to the household connection can be gained only from this inspection shaft, for which reason testing can be carried out only from one end. As at the present time there exist no testing devices for such an inspection it has been usual up to now to refrain from testing household connections.

The present operation is intended to remove this deficiency. Its purpose is to provide a device for testing whether sections of pipe which can be accessed or tested from one side only are free from leaks. It is especially intended that household connections should be capable of being tested from the inspection shaft without the main pipe having to be accessible. This task is solved by an apparatus for testing whether sections of pipe (for example, pipes for waste-water discharge, especially household connections) have sprung a leak. The apparatus has two pipe sealing pads. To the back wall of the front sealing pad is attached both a hose for emptying and filling and a connection for a distancing rod which can be pushed forward and pulled backward. The rear pipe sealing pad is a ring-shaped seal though which the pipe, tubing for releasing air and tubing for filing the space between the two sealing pads are conducted. This rear sealing pad can also be connected to the distancing rod. In addition, it has attached through to the inner area tubing for emptying and filing the space formed between the two pipe sealing pads.

The apparatus is operated in the following manner. The front pipe sealing pad is first inserted from the accessible end into the pipe to be tested. The purpose of the distancing rod is to advance the front pipe sealing pad along the section of pipe to be tested until it reaches the required position. This position can be determined by the length of the distancing rod which has been inserted or by a feeler attached to the front face of the sealing pad. Then the second or the rear, sealing pad is inserted into the piping. If the front sealing pad is inflated with air by means of the hose and the rear sealing pad is filled by means of its tubing, the two sealing pads will press all around on the inside wall of the pipe to be tested, thereby creating between them an area which can be tested. The distancing rod keeps the two pipe sealing pads the desired distance apart and absorbs such axial pressures as are produced during the subsequent testing procedure. The area between the two pipe sealing pads can now be filled with water by means of the pertinent tubing, the air between the two pads being allowed to escape via the air discharge tubing. This tubing by means of which the air is allowed to escape should ideally contain a float so that at all times the air can be drained away from even the highest point of the cross section of the pipe. When not air but water is discharged via this air discharge tubing one can ensure that the area betweent he two pipe sealing pads is filled with water.

The testing pressure of 1½ times atmospheric pressure or whatever pressure is desired is now generated and, after the flow of water to the section to be tested has been shut down, the pressure over the section which has been sealed off is observed to determine how it changes. For this purpose a manometer is attached to the tubing by means of which the area sealed off is filled. If the pressure slowly decreases, it can be assumed there is a leak in the section of piping under test. If the pressure remains constant there is no leak. Ideally, the sensor which is attached to the front face of the front pipe sealing pad should be an adjustable rod which has a sphere attached to its front end. The sphere prevents the sensor from becoming stuck in a separating device in the pipe or on small corners when the front sealing pad is inserted by means of the distancing rod into the pipe to be tested. Because the rod attached to the sensor is adjustable in length it is possible to position the front sealing pad at a predetermined location from a given, particular point. For example, when a household connection is to be tested, the length of the sensing rod is set to the diameter of the main collecting pipe into which the household pipe flows. In its preferred embodiment, the apparatus contains a special feature in that there is a seal. This permits the distancing rod to be moved axially so that even in the sealed state, that is, when the rear pipe sealing pad is expanded and thus locked in position, the position of the front sealing pad can be varied. In this way it will be possible to move the front sealing pad backwards and forwards without having to vary the position of the rear sealing pad. The position of leaks in the pipe under scrutiny can thereby be ascertained. The apparatus solves the additional task of providing a process for determining the location of a leak in pipes to which there is access from only one end, for the apparatus described above provides for testing whether or not a leak is present. In this process the rear sealing pad is expanded and thereby locked in position while the position of the front sealing pad is varied by pushing or pulling the distancing rod as required. For each test the front sealing pad is expanded at the new position so that it seals off its end of the piping, whereupon the section of piping thus sealed off by the two cushions is tested as to leaks. If indeed there is a leak in a longer section of pipe this can be verified by firstly a test over the whole length. A leak manifests itself in a loss of pressure. If a second segment has the axial position of the front sealing pad altered, and the process is repeated, then eventually it can be determined that the location of the leak is beyond the position of the front sealing pad, that is to say, outside the limits defined by the two sealing pads. This will be evident when there is no drop in pressure over the length of pipe being tested. In this way the location of each leak can be determined with very great accuracy, for example, to within 10 cm.

Further advantages and characteristics of the invention derive from the appended claims as well as from the following description, it being understood that the examples referred to are not intended to represent an exhaustive list. The examples are discussed with reference to the drawing.

THE DRAWING

The drawing illustrates preferred embodiments, in which:

FIG. 1 is an axial cross-section through the apparatus for testing whether or not a leak is present within a pipe; and FIG. 2 is a plan corresponding to FIG. 1 but for a different model.

DETAILED DESCRIPTION OF THE ILLUSTRATED EMBODIMENTS

The device for testing for leaks consists as appears from the drawing essentially of two pipe sealing pads, a front one (20) and a rear one (22). Their construction is familiar—refer to German Pat. No. 27 48 614, U.S. Pat. No. 3,459,230 Great Britain Pat. No. 1245 254 and the German Design Patent No. 84 13 877.

The front pipe sealing pad (20) has on its rear wall (24) a connection for a hose (26) by means of which the interior compartment (28) of the sealing pad can be filled or emptied as desired. In both diagrams the front sealing pad (20) is shown in its expanded state and is vat-shaped. Its cylindrical sleeve (30) is pressed hard up against the inside wall of the pipe (32) to be tested. To the center of the front, circular wall (33) of the front pipe sealing pad (20) is attached a sensor (34). It is composed of a strong coil spring (36), a rod (38) which can be varied in length, the rod being either telescopic or composed of at least two lengths which screw into each other, and a sphere (40) at the free end of the rod. The coil spring ensures that the rigid rod (38) is held elastically in the direction of the pipe (32) but that it may also be deflected from its direction without placing stress on the point of union with the front wall (33). The rod (38) should ideally be fitted with a ruler or measure so that it can be set to the various diameters and specifications of pipes, collectors etc. The sphere (40) at the free end of the rod (38) ensures that the sensor (34) does not become jammed at small points of obstruction; for example, a separating demarcation or collections of debris in the pipe. The decisive feature of the sensor (34) is simply the rod (38) which can be varied in length over the relevant range most frequently encountered in this work—e.g. 15 cm to 50 cm—and which, once set, retains the desired length without contracting. The remaining parts—coil spring (36) and sphere (40)—are improvements which ensure better operation when the unit is in service.

On its rear wall (24) the front sealing pad (20) also has a connection (42) in the shape of a ring for a rigid distancing rod (44) by means of which the pad can be pushed forward or pulled backward. This distancing rod consists ideally of individual sections which can be joined together securely and rigidly. These stiff sections, of metal or plastic, have a threaded pin at one end and, at the other, a hole with a thread to take the threaded pin of the next length. FIG. 1 shows the type of connection required. Of course, the distancing rod may also be constructed in other ways, the decisive features being that the distancing rod should be capable of being set to any desired length and that it should retain this desired length both when being pushed and when being pulled.

In the embodiments illustrated in the diagrams the rear pipe sealing pad (22) is constructed as a circular sealing pad. The rear pipe sealing pad has a ring-shaped internal area (46) which can be hermetically sealed and which can be filled and emptied by means of a tubing (48). Like the hose (26), this connection is fitted with a quick release attachment. The pipe sealing pad is sealed at the rear by a circular wall (50), but at the front its inner area is open, that is to say, it is mug-shaped. The hose (26), filling tube (51), (the purpose of which will be described later) and a tube for allowing air to escape are routed through the circular wall (50) in such a wall as to be impervious to air and water. The tubing (52) terminates in an area (54) that is referred to in what follows as the space (54) between the two pipe sealing pads (20, 22). This tubing (52) is also fitted with a float (56) which ensures that when the space (54) between the two sealing pads is filled with water, the end of the tubing by means of which the air is expelled (on the left side in the drawing) is always at the upper limits of the cross section of the pipe which is to be tested. Thus all the air present in the pipe can be bled away.

The distancing rod (44) is attached to the cylindrical central sleeve of the pipe sealing pad (22) through a star shaped connection. Other means of attachment may also be employed, since the illustrated connection is just one of several possibilities. The decisive feature is that the rear pipe sealing pad (22) should be capable of being joined to the distancing rod (44) so that over the length of the distancing rod (44) at least a part of those forces acting in the axial direction of the pipe (32) are absorbed when the space (54) is filled with water under pressure. In this way it is possible with the two pipe sealing pads (20, 22) to generate without any loss a considerable pressure in the space they form without fearing that a pipe sealing pad will yield under pressure and be displaced axially. If it starts to move it must of necessity drag the other pipe sealing pad with it against the pressure of the water column built up in the space between them (54). In principle, however, it is not necessary to attach the distancing rod (44) also to the rear pipe sealing pad. The distancing rod serves principally to push the front pipe sealing pad axially forward and pull it backwards in the pipe (32). In a somewhat inferior model of the invention it would therefore be possible to have the right end (FIG. 1) of the distancing rod (44) rest on the interior wall of the pipe (32) or on the inner sleeve of the ring-shaped pipe sealing pad (22). If this is done, handling the unit is not as satisfactory, for the end of the pipe in each instance has to be picked up and normally falls to the bottom of the pipe (32) which, as concerns pipes which are already in service, is inevitably dirty.

The tubing for bleeding off the air (52) has in its rear section at the end behind the pipe sealing pad (22) a valve (not shown) and is also connected to a pressure gauge (58) by means of which the pressure in the space (54) between the two pipe sealing pads is monitored.

When the unit is to be used, the sensor of the front sealing pad (20) is set to the required length. Its length should correspond essentially to the diameter of the collecting pipe at the other, non accessible end of the pipe (32). In place of the collecting pipe (60) there may be an elbow in the pipe, a shaft or the like. The decisive feature is that this part is not directly accessible, for which reason the test as to leaks in the pipe (32) can or should be conducted only from the inspection shaft (62) (shown on the right in the diagrams). After the sensor (34) has been adjusted the front pipe sealing pad (20) is pushed in its uninflated state through the pipe (32) from the inspection shaft. Of course, the pipe can be of any length. The pipe sealing pad (20) is moved by the distancing rod (44) which is made up of sections of, for example, one meter in length. These sections are screwed together (like the piping in oil-drilling) and the number used provides at the same time a simple measure of the distancing rod (44). When the front sensor touches up against the rear wall of the collecting pipe (60), that is, when the end—the sphere (40)—encounters the limit be it an elbow, cross pipe or the like, positive resistance to further forward motion will be registered. The resistance is, moreover, communicated to the user by the elastic effects of the spring (36). When this point is reached the last addition to the distancing rod (44) is removed if necessary and the right (as shown in the diagrams) end of the distancing rod (44) is connected to the rear pipe sealing pad. This rear sealing pad is now inserted into the pipe (32), if necessary after the front sealing pad has been retracted a little, whereupon the front sealing pad (20) is also pushed forward again. In this way the position illustrated in FIG. 1 is achieved, which position is the starting point for the test to determine whether or not a leak is present.

The two pipe sealing pads (20, 22) are now filled with air via the hose (26) or, respectively, the connection (48). They seal off by means of their jackets the space between them (54). In the next step this space is slowly filled with water by means of the filling tube (51). The level of the water (64) rises in this space (54)—the process is suggested in the drawing at a point during this stage of the procedure. Above the water level (64) there is a layer of air (66). By virtue of the float (56) the pipe for bleeding off the air (52) protrudes into this layer of air, thereby enabling the air to be discharged through the tubing (52). Thus the layer of air (66) does for all practical purposes disappear as the space (54) continues to be filled with water via the connection (51). All the air has been expelled when nothing but water is discharged at the exhaust end of the tubing for discharging air. At this point the discharge end of the tubing for releasing the air (52) is sealed off and the pressure in the space (54) between the two pipe sealing pads is increased by means of the relevant connection (51). The pressure can be read from the pressure gauge (58). When the desired pressure has been established the connection (51) is sealed by a valve (not shown) thereby sealing off the whole unit. If now the pressure in the space (54) between the two pipe sealing pads remains constant—it can be read off the pressure gauge (58)—over a period of time then there is no leak over this space or length of pipe. If, however, the pressure falls, then there is a leak present, and the rate of leakage can be ascertained (roughly) from the rate at which the pressure drops.

With the help of the apparatus for ascertaining the presence of leaks as demonstrated in FIG. 1, it is possible to test pipes for leakage before they are rendered inaccessible, that is, for example, before soil or a protective jacket or the like is placed over them. By reason of the distancing rod (44) which ties together the two pipe sealing pads (20, 22) a relatively high pressure can be introduced into the space between them without danger of the two pads changing position, that is, slipping. This pressure is greater than that which the two pipe sealing pads (20, 22) could withstand if they were not linked together by the distancing rod (44).

In models completed according to details shown in FIG. 2, the distancing rod (44) is not at its right extremity attached rigidly to the rear pipe sealing pad (22). Rather, the distancing rod (44) is, even though properly and absolutely sealed, capable of being moved axially in respect to the rear pipe sealing pad (22) so that the front pipe sealing pad (20) can be moved axially without it being necessary to alter the position of the rear pipe sealing pad (22).

In the embodiment illustrated in FIG. 2 there is, mounted centrally, a tube approximately the same length as the pipe sealing pad. On each end of this tube is a ring seal which allows the lengths of the distancing rod to slide through. Thus the distancing rod can be lengthened at will without there being any danger that leakage will occur. A disc (70) ensures that the distancing rod (44) cannot be withdrawn completely from the tube (68). This distancing rod (44) is itself composed of individual sections linked together by a bayonet or screw (threaded) connection. In this way the distancing rod assumes over its whole length a uniformly smooth exterior, and so the ring seal ensures that no leakage occurs no matter what the position of the distancing rod may be.

The embodiment illustrated in FIG. 2 facilitates the location of a leak (72) in a pipe (32). Firstly, the front pipe sealing pad (20) should be in the position indicated by the full lines in FIG. 2, that is, in the left position. If now the space (54) between the two pipe sealing pads is filled with water, water will flow away through the leak (72). This will be evident by a drop in pressure as measured on the pressure gauge (58).

If now the front pipe sealing pad (20) is deflated and repositioned by means of the distancing rod (44) somewhat closer to the rear pipe sealing pad (22), see the shaded position in the diagram, then the leak (72) will no longer be in the space (54) between the two pipe sealing pads. Thus, the test for leakage conducted in this position will reveal no leak. It will have been established that the leak (72) in the pipe must be situated between the two designated positions of the front pipe sealing pad (20).

In testing for leaks in accordance with the German Industry Norms 40 33, to which reference has already been made, a pressure gauge (58) is not necessary, as the amount of leakage can be observed by monitoring as described below a drop in level. For this purpose a hose is attached to either the tubing for filling (51) or to the tubing for the discharge of air (52). This hose—if a pressure 1½ times that of the atmosphere is to be used—will end 5 meters above the level of the pipe to be tested, thereby creating in the pipe a pressure of 0.5 bar. The other connection (52 or 51) is sealed off. An observation of the water column will determine whether a leak is present; and its size can be ascertained by the rate at which water has to be added to maintain the water level constant.

I claim:

1. An apparatus for testing whether sections of pipe have sprung a leak, which apparatus at its front end is fitted with a front pipe sealing pad having a cylindrical sleeve and two circular walls at each end of the sleeve, said sleeve and said two walls defining an internal compartment, a hose being attached to the rear wall of the said two walls by means of which the internal compartment can be filled or emptied, and a connection for a distancing rod being attached to the said rear wall for pushing and pulling the said pad, the rod being connected to a mug-shaped rear pipe sealing pad which is composed of two concentric sleeves, a radial, circular shaped wall, and a sealing wall at one end which two sleeves and two walls define a ring-shaped internal area which can be hermetically sealed and which can be filled or emptied by means of a connection; the apparatus further comprising a tubing for removing air having an end between the two pipe sealing pads, a float being attached to this end of said tubing for emptying out air, and a filling tube; wherein the hose, the tubing for removing air and the filling tube are routed through the circular wall, which rear pipe sealing pad can be connected to the distancing rod.

2. An apparatus as set forth in claim 1, characterized that the distancing rod (44) is made up of individual, rigid, round component sections, which sections are joined together via rigid connections.

3. An apparatus as set forth in claim 1, characterized that the distancing rod (44) contains a component part which over its entire length is composed of adjustable lengths.

4. An apparatus as set forth in claim 1, characterized that the front sealing pad (20) has attached to its front wall (33) a sensor (34) which has a rigid rod the length of which can be varied (38) and a sphere (40) at its free end.

5. An apparatus as set forth in claim 1, characterized that both the sealing pads (20, 22) for the pipe have the same external diameter.

6. An apparatus as set forth in claim 1, characterized that to that part of the tube for emptying the air (52) which is outside of the rear sealing pad (22) there is arranged a sealing valve and, between said valve and the rear sealing pad, a pressure gauge (58).

7. An apparatus as set forth in claim 1, characterized that the sealing pad at the rear (22) contains, centrally attached, a sliding ring-seal through which the distancing rod (44), properly sealed, is passed and that the distancing rod is round and axially movable in the said ring-seal.

* * * * *